UNITED STATES PATENT OFFICE.

FLOYD J. METZGER, OF NEW YORK, N. Y.

SYNTHETIC PRODUCTION OF AMMONIA.

1,313,316.   Specification of Letters Patent.   Patented Aug. 19, 1919.

No Drawing.   Application filed June 12, 1918.   Serial No. 239,579.

*To all whom it may concern:*

Be it known that I, FLOYD J. METZGER, a citizen of the United States, residing at New York city, in the county of New York, State of New York, have invented certain new and useful Improvements in Synthetic Production of Ammonia; and I do hereby declare the following to be a full, clear, and exact description of the invention, such as will enable others skilled in the art to which it appertains to make and use the same.

This invention relates to the catalytic production of ammonia by direct synthesis from nitrogen and hydrogen.

In the catalytic production of ammonia, it has been proposed to add to the catalyzers small amounts of various substances in order to increase the activity thereof. Such added substances or agents are commonly known as "promoters." Many "promoters" of different kinds have heretofore been proposed. Among these may be mentioned the alkali metals, or the alkalin earth metals, or their compounds or mixtures, which it has been proposed to add to such catalizers as iron, cobalt, nickel, and the like.

In general, it may be said that the promoters heretofore proposed, as well as the catalyzers themselves, are quite sensitive to so-called poisons contained in the mixed nitrogen and hydrogen gases, and especially to any traces of moisture either contained in the gases as such, or formed, during the process, by the combination of hydrogen with small quantities of oxygen or oxygen-containing compounds.

The present invention relates to an improved process for the catalytic production of ammonia, according to which unsaturated organic compounds are used as promoters of catalytic activity of the primary catalysts. Such organic compounds may be used, either alone or with other organic substances, in conjunction with the catalyzers the action of which it is desired to promote, forming fluent catalyzing compositions or composite catalyzers.

In my companion application, Serial No. 239,578, filed of even date herewith, I have described a catalytic process in which organic substances are used with the catalyzers, and improved catalyzers containing such organic substances, the catalyzers being carried by the organic substances in fluent form.

The present application relates to certain embodiments of the more general and more comprehensive invention of said companion application, and to certain improvements thereon, and more particularly to embodiments and improvements in which the organic liquid is an unsaturated liquid, capable of being hydrogenated.

The catalyzers utilized in the process of the present invention are made up of the catalyzers themselves, properly so-called, and of the novel promoters therefor. These promoters are in a liquid or semi-liquid state when in actual use in the catalytic process. These promoters may be generally stated to belong to the general class of organic substances or compounds known as unsaturated compounds, and especially unsaturated compounds which are themselves capable of being hydrogenated,—that is,—combining with hydrogen when brought into contact therewith, in the presence of a suitable catalyzer, and under suitable conditions of temperature, pressure and the like.

The particular unsaturated compound or compounds to be used in the novel catalytic process of the present invention, will depend upon various considerations, among which may be mentioned the predetermined conditions of temperature, pressure, and the like to be maintained during the catalytic production of ammonia, the availability of the organic compounds, and the like. The promoter should thus be of a liquid or semi-liquid character, or it should be capable of being liquefied and of remaining liquid or semi-liquid, at the temperature of the catalytic process. The boiling point of the promoter at the pressure at which it is to be used, should be above the maximum temperature reached in the process.

In general the catalyzer utilized in the process of the present invention may be prepared in the manner described in said companion application. This method of preparation will be illustrated by the following description: Cerium nitrid, or hydrid, or a mixture of the two, together with the unsaturated organic compound which is to serve as the promoter, is ground to an impalpable or semi-colloidal state in a ball or pebble mill. Instead of a single unsaturated organic substance, a mixture of such substances may be used as the promoter, or a solution of such organic substance or substances may be used in other suitable organic compounds or solvents which are not prejudicial to the catalytic process, or which may themselves serve further to promote such process. The product removed from the ball or pebble mill will accordingly contain the primary catalyzer, that is, the cerium nitrid or hydrid, or mixture thereof, together with the unsaturated organic compound or compounds serving as the promoter. This composite catalyzer product is then ready for use and may be stored in a suitable container, where it should be preferably protected from the air in any suitable manner.

I have found that such a composite catalyzer prepared from cerium nitrid or hydrid, or from the mixed nitrids or hydrids, or from alloys of rare earth metals, by grinding the same to an impalpable or semi-colloidal state in refined cottonseed oil, or in other organic liquid to which cottonseed oil has been added, has a considerably greater activity than when the catalyzer is made from the same metal compounds without the addition of the cottonseed oil.

Cottonseed oil is composed of a mixture of fats or glycerids for the most part unsaturated in character, and these constituents are easily hydrogenated under proper thermal conditions when brought into contact with hydrogen in the presence of a suitable catalyzer. The temperature and conditions for the hydrogenation of cottonseed oil are moreover similar to those which are suitable for the synthetic production of ammonia, according to the process of the present invention. Accordingly, when nitrogen and hydrogen are brought into contact with the catalyzer and with the cottonseed oil, at temperatures suitable for the catalytic production of ammonia and for the catalytic hydrogenation of the oil, it is to be expected that the hydrogenation of the oil to a greater or less extent will be brought about through the intervention of the same catalyzers which bring about the direct combination of the nitrogen and hydrogen with the production of ammonia.

Without attempting to explain the exact character of the relation of this hydrogenation of the cottonseed oil to the catalytic production of ammonia, I will say that the results obtained make it seem probable that the hydrogenation of the cottonseed oil plays an auxiliary role in the ammonia synthesis, serving to promote such synthesis, so that the cottonseed oil may be considered to be a promoter in the ammonia production process.

I have also obtained good results by using diphenyl ($C_6H_5.C_6H_5$) as promoter, this unsaturated organic substance being prepared and used in the same general manner as above described in connection with cottonseed oil. Diphenyl is likewise an unsaturated organic body which is capable of being hydrogenated, under similar conditions to those used in the synthetic production of ammonia and in the catalytic hydrogenation of cottonseed oil.

The catalyzers employed in the catalytic process of the present invention, prepared with the organic promoters of the general class above mentioned, to wit: unsaturated organic compounds or substances, have been found to possess a materially longer active life than catalyzers prepared without such organic substances. These catalyzers are accordingly of importance in the synthetic production of ammonia and enable such synthetic production to be caried out with increased advantage.

In the synthetic production of ammonia, from nitrogen and hydrogen, it is highly desirable that the catalyzer should be highly active, and that it should in addition possess a long life so that the catalytic process can be continued for considerable periods of time without depreciation of the catalyzer to such an extent as to make the process unprofitable. It is also of importance in this process to carry out the process at as low a temperature as possible.

The improved catalyzers of the present invention, are well adapted for the production of ammonia synthetically at relatively low temperatures, and give commercial results without employing the very high pressures and temperatures which it has been proposed to use in prior processes for promoting the catalytic reaction in ammonia synthesis. The catalyzers of the present invention are highly active at temperatures as low as 200° C. or up to the temperatures of objectionable decomposition of the organic substance employed.

The promoters employed in the production of the novel catalyzers of the present invention, and in the catalytic production of ammonia therewith, have the additional advantage of protecting the primary catalyzers during the catalytic process so that they thereby further contribute to the prolongation of the active life of the catalyzers and to the increased efficiency of the catalytic process as a whole. Where the catalyzers are protected by the organic substances, there is less tendency for these catalyzers to become coated by the poisons or by reaction with the oxygen or moisture contained in the reacting gases, so that there is less tendency for the catalyzer particles to become inactive in this way.

Furthermore, where the organic substances are used, the catalyzer as a whole is in a fluent state and can be circulated or otherwise kept in motion and its active life and catalytic efficiency thereby further increased. The agitation or circulation of the fluent catalyzer can be so effected that any film of catalyzer poison which forms on the surface of the catalyzer particles will tend to become removed by abrasion or otherwise, so that the activity of the particles will be thereby to a greater or less extent restored and the activity of the catalyzer thereby prolonged. Any detached film of oxid or other material will remain suspended in the liquid medium without exerting any objectionable effect upon the continuation of the catalytic process.

In my said companion application, Serial No. 239,578 I have described in considerable detail the catalytic process in which a composite catalyzer, in fluent form, is employed, and have illustrated a suitable type of apparatus for bringing about the circulation of the fluent catalyzer during the catalytic process in such a way as to take advantage of the fluent character of the catalyzer. The process, as described in said companion application, may, moreover, be carried out with oscillation, or fall and rise, of the temperature during the process, so that the process is thereby further improved. The process of the present invention can similarly be carried out, and with similar or added advantage in the same general manner, and in the same or similar types of apparatus.

In the carrying out of the catalytic process of the present invention, the composite catalyzer containing the primary catalyzer carried by the liquid promoter, may be brought into contact with the nitrogen and hydrogen gases in various ways. The reaction can be carried out at different temperatures and particularly at such temperatures as will result simultaneously in the production of ammonia and in the hydrogenation of the unsaturated organic substances constituting the promoters. For example, when cottonseed oil is used as the promoter, the synthetic production of ammonia may be carried out at temperatures around 200° C., and this temperature may be caused to fall and rise from 200° C. down to 150° C., or lower during the progress of the reaction. The catalyzer may be caused to flow down through an apparatus through which the nitrogen and hydrogen gases are caused to ascend and the desired intimate intermixture may be thereby effected; or the gases may be brought into contact with the fluent catalyzer by various mechanical means which will bring about the required intimacy of intermixture.

From the above description it will be evident that many organic substances may be used as promoters in the production of the improved catalyzers and in the catalytic reaction for the production of ammonia which is practised therewith. So, also, it will be evident that various methods of procedure may be followed and various types of apparatus may be used without departing from the spirit and scope of the invention.

In so far as I am aware, it is broadly new to combine unsaturated organic compounds, for example, cottonseed oil with catalysts adapted for use in the catalytic production of ammonia, and to use such catalyzers, together with promoters of this character, in such catalytic production, and the claims appended hereto are intended to have a correspondingly broad signification.

Although, as hereinbefore indicated, it is not necessary, for the obtaining of commercial results, to employ, in the practice of the present invention, the very high pressures proposed in prior processes for the synthetic production of ammonia from nitrogen and hydrogen mixtures, it will nevertheless be understood that when higher yields are desired, relatively high pressures will, in most cases, be desirable,—say even up to fifty to two hundred atmospheres. In fact, event higher pressures may be employed, but usually without compensating benefit.

I claim:

1. The method of producing ammonia synthetically, which comprises bringing a mixture of hydrogen and nitrogen gases into intimate contact with a fluent catalyzing composition, made up of a finely divided catalyzer in an unsaturated organic vehicle, at a temperature appropriate to the production of ammonia therewith.

2. The method of producing ammonia synthetically, which comprises bringing a mixture of hyrogen and nitrogen gases into intimate contact with a catalyzing composition, made up of a finely divided catalyzer in an unsaturated oil, at a temperature appropriate to the catalytic production of ammonia therewith.

3. The method of producing ammonia synthetically, which comprises bringing a mixture of hydrogen and nitrogen gases into intimate contact with a catalyzing composition, made up of a finely divided catalyzer in cottonseed oil at a temperature appropriate to the catalytic production of ammonia.

4. The method of producing ammonia synthetically and of effecting the hydrogenation of unsaturated organic liquids, which comprises bringing a mixture of hydrogen and nitrogen gases into intimate contact with a catalyzing composition, made up of a finely divided catalyzer in the unsaturated organic liquid, at a temperature appropriate to the catalytic production of ammonia and the catalytic hydrogenation of the unsaturated organic liquid.

5. The method of producing ammonia synthetically and of effecting hydrogenation of unsaturated fatty oils, which comprises bringing a mixture of hydrogen and nitrogen gases into intimate contact with a catalyzing composition, made up of a finely divided catalyzer in an unsaturated fatty oil vehicle at a temperature appropriate to the catalytic production of ammonia and to the catalytic hydrogenation of the fatty oil.

6. The method of producing ammonia synthetically, and hydrogenating cottonseed oil, which comprises bringing a mixture of hydrogen and nitrogen gases into intimate contact with a catalyzing composition, made up of a finely divided catalyzer in cottonseed oil at a temperature appropriate to the catalytic production of ammonia and to the hydrogenation of the cottonseed oil.

7. The method of producing ammonia synthetically, which comprises bringing a mixture of hydrogen and nitrogen gases into intimate contact with a catalyzing composition under a high pressure and at a temperature below 400° C. and effecting intimate intermixture of the liquid catalyzer with the gaseous mixture, said liquid catalyzer being made up of a finely divided catalyzer and of an unsaturated organic liquid.

8. The method of producing ammonia synthetically, which comprises bringing a mixture of hydrogen and nitrogen gases into intimate contact with a finely divided catalyzer at a temperature appropriate to the catalytic production of ammonia, and in the presence of an unsaturated organic substance adapted to be hydrogenated at the temperature of the catalytic reaction.

9. The method of producing ammonia synthetically, which comprises bringing a mixture of hydrogen and nitrogen gases into intimate contact with a finely divided cerium catalyzer, at a temperature appropriate to the catalytic production of ammonia therewith, and in the presence of an unsaturated organic substance.

10. The method of producing ammonia synthetically, which comprises bringing a mixture of hydrogen and nitrogen gases into intimate contact with a finely divided cerium catalyzer, at a temperature appropriate to the catalytic production of ammonia therewith, and in the presence of an unsaturated organic liquid capable of being hydrogenated at the temperature of the reaction.

11. The method of producing ammonia synthetically, which comprises bringing a mixture of hydrogen and nitrogen gases into intimate contact with a finely divided cerium catalyzer, at a temperature appropriate to the catalytic production of ammonia therewith, and in the presence of cottonseed oil.

12. The method of producing ammonia synthetically, which comprises bringing a mixture of hydrogen and nitrogen gases into contact with a catalyzing composition, made up of a finely-divided catalyzer material and an unsaturated organic liquid, and causing the temperature of such catalyzer to rise and fall periodically during the catalytic reaction.

13. The method of producing ammonia synthetically, which comprises circulating a mixture of hydrogen and nitrogen gases into intimate contact with a catalyzing composition made up of a finely divided catalyzer and an unsaturated organic liquid, at a temperature appropriate to the catalytic production of ammonia and to the hydrogenation of the unsaturated organic liquid, and causing the temperature of the catalyzer to rise and fall periodically during the progress of the catalytic reaction.

14. In the production of ammonia synthetically, according to the procedure as defined in claim 1, the carrying on of said procedure at superatmospheric pressure.

15. In the production of ammonia synthetically, according to the procedure as defined in claim 7, the carrying on of said procedure at super-atmospheric pressure.

16. In the production of ammonia synthetically according to the procedure as defined in claim 9, the carrying on of said procedure at superatmospheric pressure.

17. In the production of ammonia synthetically according to the procedure as defined in claim 10, the carrying on of said procedure at super-atmospheric pressure.

In testimony whereof I affix my signature.

FLOYD J. METZGER.